United States Patent
Hoff et al.

(10) Patent No.: US 8,360,180 B2
(45) Date of Patent: Jan. 29, 2013

(54) SYSTEM FOR CONTROLLING A HYBRID ENERGY SYSTEM

(75) Inventors: Brian D. Hoff, East Peoria, IL (US); Sivaprasad Akasam, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1431 days.

(21) Appl. No.: 12/003,721

(22) Filed: Dec. 31, 2007

(65) Prior Publication Data

US 2012/0310414 A1  Dec. 6, 2012

(51) Int. Cl.
*B60W 20/00* (2006.01)
(52) U.S. Cl. .................. 180/65.265; 180/65.29; 701/50
(58) Field of Classification Search ............... 180/65.21, 180/65.265, 65.27, 65.275, 65.28, 65.29, 180/65.31, 305; 903/903, 907; 701/22, 50
See application file for complete search history.

(56) References Cited

U.S. PATENT DOCUMENTS

| | | | |
|---|---|---|---|
| 3,566,717 A | | 3/1971 | Berman et al. |
| 5,170,342 A | * | 12/1992 | Nakamura et al. ............ 700/65 |
| 5,359,517 A | | 10/1994 | Moriya et al. |
| 5,627,752 A | | 5/1997 | Buck et al. |
| 5,647,562 A | | 7/1997 | Lumbis et al. |
| 5,682,312 A | * | 10/1997 | Rocke ............................ 701/50 |
| 5,832,396 A | | 11/1998 | Moroto et al. |
| 5,898,282 A | | 4/1999 | Drozdz et al. |
| 6,166,449 A | | 12/2000 | Takaoka et al. |
| 6,223,110 B1 | * | 4/2001 | Rowe et al. ..................... 701/50 |
| 6,242,873 B1 | | 6/2001 | Drozdz et al. |
| 6,344,732 B2 | * | 2/2002 | Suzuki .......................... 320/132 |
| 6,381,522 B1 | | 4/2002 | Watanabe et al. |
| 6,488,608 B2 | | 12/2002 | Yamaguchi et al. |
| 6,507,127 B1 | * | 1/2003 | Amano et al. ................ 290/40 C |
| 6,687,607 B2 | | 2/2004 | Graf et al. |
| 6,851,207 B2 | * | 2/2005 | Yoshimatsu ..................... 37/348 |
| 6,895,320 B2 | | 5/2005 | Bauer et al. |
| 6,986,398 B2 | | 1/2006 | Obayashi |
| 7,013,205 B1 | | 3/2006 | Hafner et al. |

(Continued)

FOREIGN PATENT DOCUMENTS

| EP | 1288505 | 3/2003 |
|---|---|---|
| EP | 2022748 | 2/2009 |

(Continued)

OTHER PUBLICATIONS

U.S. Appl. No. 11/797,011, filed Apr. 30, 2007.

*Primary Examiner* — John Walters
*Assistant Examiner* — Brian Swenson
(74) *Attorney, Agent, or Firm* — Finnegan, Henderson, Farabow, Garrett & Dunner LLP

(57) ABSTRACT

A method includes identifying a first operating sequence of a repeated operation of at least one non-traction load. The method also includes determining first and second parameters respectively indicative of a requested energy and output energy of the at least one non-traction load and comparing the determined first and second parameters at a plurality of time increments of the first operating sequence. The method also includes determining a third parameter of the hybrid energy system indicative of energy regenerated from the at least one non-traction load and monitoring the third parameter at the plurality of time increments of the first operating sequence. The method also includes determining at least one of an energy deficiency or an energy surplus associated with the non-traction load of the hybrid energy system and selectively adjusting energy stored within the storage device during at least a portion of a second operating sequence.

23 Claims, 2 Drawing Sheets

U.S. PATENT DOCUMENTS

| | | |
|---|---|---|
| 7,069,673 B2 * | 7/2006 | Kagoshima et al. ............ 37/348 |
| 7,104,347 B2 | 9/2006 | Severinsky et al. |
| 7,137,344 B2 | 11/2006 | Kumar et al. |
| 7,185,591 B2 | 3/2007 | Kumar et al. |
| 7,222,004 B2 | 5/2007 | Anderson |
| 7,231,877 B2 | 6/2007 | Kumar |
| 7,237,492 B2 | 7/2007 | Inarida |
| 7,237,634 B2 | 7/2007 | Severinsky et al. |
| 7,252,165 B1 | 8/2007 | Gruenwald et al. |
| 7,258,183 B2 | 8/2007 | Leonardi et al. |
| 7,748,147 B2 * | 7/2010 | Schoenmaker et al. ......... 37/348 |
| 2003/0009269 A1 | 1/2003 | Graf et al. |
| 2006/0005737 A1 | 1/2006 | Kumar |
| 2010/0332061 A1 * | 12/2010 | Forslow et al. ................. 701/22 |

FOREIGN PATENT DOCUMENTS

| | | |
|---|---|---|
| FR | 2811268 | 4/2010 |
| JP | 2001090120 | 4/2001 |
| WO | 2007138862 | 12/2007 |

* cited by examiner

SYSTEM FOR CONTROLLING A HYBRID ENERGY SYSTEM

STATEMENT OF GOVERNMENT INTEREST

This invention was made with Government support under Contract No. DE-FC36-01GO11095 awarded by the Department of Energy. The Government may have certain rights in this invention.

TECHNICAL FIELD

The present disclosure relates to a hybrid energy system and, more particularly, to a method and apparatus for controlling a hybrid energy system.

BACKGROUND

Hybrid energy systems typically include an engine having its prime mover, e.g., a crankshaft, mechanically decoupled from one or more loads, e.g., traction and/or non-traction loads. Hybrid energy systems usually also include an energy storage device configured to store energy received from either the engine during an engine overpowering mode or from the loads during an energy regenerating mode. The engine and storage device are electrically coupled to the loads via a motor-generator to allow the engine to also operate as an energy source rather than a conventional drive mechanism and allowing the storage device to recover regenerated energy. The amount and frequency of operated-requested and regenerated energy with respect to the loads are usually independent of the amount of energy stored within the storage device. Often, regenerated energy is wasted as heat because the storage device can only accept a portion of the regenerated energy. Additionally, the engine output is often increased to satisfy energy demands from the loads because the storage device can only output a portion of the demanded energy. Furthermore, operator-requested energy may periodically exceed the maximum energy output of the engine and storage device.

U.S. Pat. No. 5,832,396 ("the '396 patent") issued to Moroto et al. discloses a hybrid vehicle having a hybrid energy system including a battery and a method for charging the battery. The method of the '396 patent includes inputting a destination and determining a route that the vehicle may take. The method also includes determining the current residual charge of the battery and makes a schedule for a target value of the residual charge in the battery based on the driving route, present location of the vehicle, and road conditions. The schedule is based on the necessary driving output estimated from the route information, such as altitude or road type. If the vehicle is being driven on the determined route, a controller controls the current residual charge of the battery to match the scheduled residual charge of the battery at a given location on the determined route by adjusting the output of a motor and/or engine. If the determined route includes an initial uphill slope and a subsequent downhill slope, the engine may be operated to increase the residual charge of the battery to be approximately 100% before driving uphill and the residual charge of the battery may not be immediately replenished because the battery will be later charged when driving downhill.

Because the method of the '396 patent adjusts the residual charge of the battery based on road conditions, the controller includes a memory for storing map data for the driving route. Although map data may be readily available for on-road applications, e.g., permanent highways, it may not be readily available for off-road applications, e.g., temporary construction sites. Additionally, the method of the '396 patent may charge and discharge the battery based on changing traction loads, energy demands, and regeneration, however, it may not account for changing non-traction loads.

The present disclosure is directed to overcoming one or more of the shortcomings set forth above.

SUMMARY

In one aspect, the present disclosure is directed to method of controlling a hybrid energy system. The method includes identifying a first operating sequence indicative of a repeated operation of the at least one non-traction load. The first operating sequence includes a plurality of time increments. The method also includes determining first and second parameters of the hybrid energy system respectively indicative of a requested energy of the at least one non-traction load and an output energy of the at least one non-traction load. The method includes comparing the determined first and second parameters at the plurality of time increments of the first operating sequence. The method also includes determining a third parameter of the hybrid energy system indicative of energy regenerated from the at least one non-traction load. The method also includes monitoring the third parameter at the plurality of time increments of the first operating sequence. The method also includes determining at least one of an energy deficiency or an energy surplus associated with the non-traction load of the hybrid energy system. The energy deficiency is a function of the first and second determined parameters and the energy surplus is a function of the third determined parameter. The method further includes selectively adjusting energy stored within the storage device during at least a portion of a second operating sequence as a function of the determined energy deficiency or the determined energy surplus. The second operating sequence includes a plurality of time increments.

In another aspect, the present disclosure is directed to a machine including a hybrid energy system including an energy source, an energy storage device, at least one non-traction load, and a controller. The controller is configured to monitor one or more parameters of the machine during a first manipulation sequence of the non-traction load. The controller is also configured to determine a first energy indicative of an amount of energy requested by an operator to be directed toward the at least one non-traction load during the first manipulation sequence. The controller is also configured to determine a second energy indicative of an amount of energy output from the at least one non-traction load during the first manipulation sequence. The controller is also configured to determine a third energy indicative of an amount of energy regenerated from the at least one non-traction load during the first manipulation sequence. The controller is further configured to automatically control the energy stored within the storage device during a second manipulation sequence as a function the determined first, second, and third energies. The second manipulation sequence is substantially similar to the first manipulation sequence.

DETAILED DESCRIPTION

Figure 1:
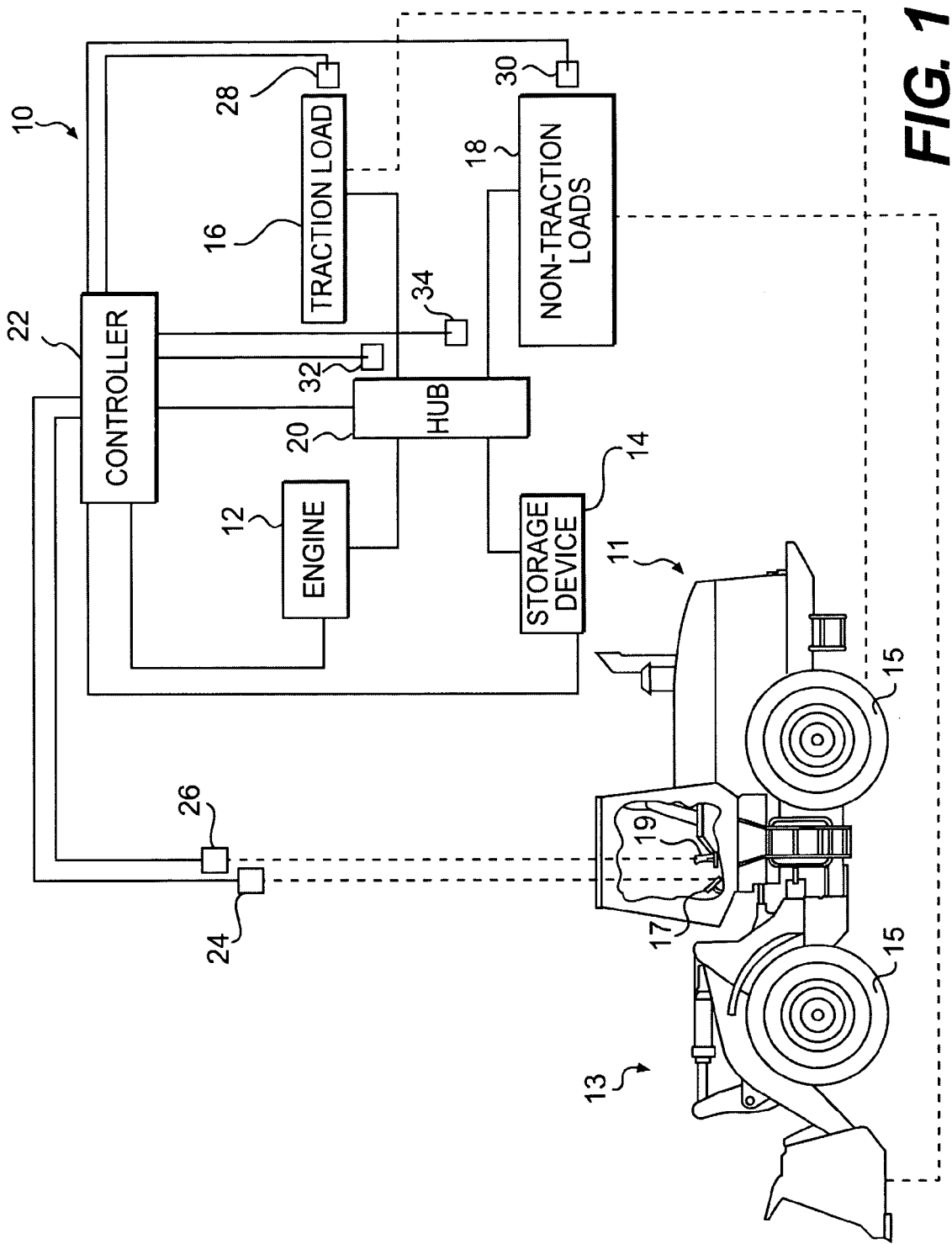
FIG. 1 is a diagrammatic illustration of an exemplary hybrid energy system of a machine in accordance with the present disclosure.

FIG. 1 illustrates an exemplary hybrid energy system 10. Specifically, system 10 may include an engine 12 and a storage device 14 and may be configured to selectively supply energy to a traction load 16 and non-traction loads 18 via a hub 20. Hub 20 may selectively receive energy from engine 12, storage device 14, traction load 16, and/or non-traction loads 18 and direct received energy to engine 12, storage device 14, traction load 16, and/or non-traction loads 18. System 10 may also include a controller 22 to operatively control the operation of engine 12 and storage device 14 and/or direct energy to one or more components of system 10 via hub 20. System 10 may be operatively connected to machine 11 to propel machine 11 relative to a surface and/or manipulate implement 13 operatively connected to machine 11. Machine 11 may be a fixed or mobile machine that performs some type of operation associated with an industry such as, for example, mining, construction, farming, or any other industry known in the art. For example, machine 11 may be an earth moving machine such as an excavator, a backhoe, a loader, a dozer, a motor grader, or any other earth moving machine. Implement 13 may include a blade, a bucket, a shovel, a ripper, and/or a linkage configured to perform a task. It is contemplated that system 10 and/or machine 11 may include one or more additional and/or different components, such as, for example, a transmission device, e.g., a mechanical or electrical transmission device, gearing, electrical and/or hydraulic conduits, and/or other components known in the art. Additionally, it is noted that power is the rate of using energy to perform work, i.e., Power=Energy/Time, and that power varies as both a function of the amount of energy used and the rate at which energy is used. Thus, as power is requested and/or transferred between components of system 10, energy is transferred per time.

Engine 12 may include any conventional energy source configured to convert energy from one form to another such as, for example, a gasoline or diesel combustion engine, a fuel cell, a natural gas engine, a turbine and/or any other energy conversion device. Engine 12 may also include a prime mover, e.g., a crankshaft, (not shown) that is mechanically decoupled from traction load 16 and non-traction loads 18. Engine 12 may be operatively connected to hub 20 via an electrical, mechanical, and/or hydraulic connection and may effectively operate as a source of energy. Engine 12 may be controlled by controller 22 to selectively vary the amount of energy output therefrom as a function of controller 22 varying one or more operating parameters of engine 12, e.g., an amount of fuel injected into a combustion chamber or the timing of intake and exhaust valves.

Storage device 14 may include any source of energy, such as, for example, an electrical circuit, and may be configured to selectively receive, store, and deliver energy. Storage device 14 may include an electrical circuit receiving energy from engine 12, traction load 16, and/or non-traction loads 18, via hub 20, storing energy, and/or delivering energy to engine 12, traction load 16, and/or non-traction loads 18. It is contemplated that storage device 14 may include any quantity, type, and/or size of batteries, one or more capacitors, and/or other components configured to store electrical energy. It is also contemplated that storage device 14 may be alternatively configured as a hydraulic circuit with one or more pumps and/or accumulators configured to receive and store hydraulic energy.

Traction load 16 may include one or more propulsion components of machine 11 such as, for example, a traction device 15, a marine propeller, and/or any type of propulsion load known in the art. Specifically, traction load 16 may operate to consume energy directed from hub 20 in a propulsion mode, and traction load 16 may operate to produce energy directed toward hub 20 in a dynamic braking mode. For example, traction load 16 may include a motor-generator configured to, in a propulsion mode, convert electrical energy received from hub 20 into mechanical energy to be delivered to one or more traction devices 15. Additionally, the motor-generator may be configured to, in a dynamic braking mode, convert mechanical energy received from one or more traction devices 15 into electrical energy to be delivered to hub 20. Traction load 16 may be a variable load, may be periodically operated, may repeat a given cycle, may dynamically change during operation of system 10, and may affect one or more operating parameters of engine 12 and/or storage device 14 to correspondingly change. For example, traction load 16 may vary as traction devices 15 interact with different materials and/or different grades of a surface, traction load 16 may vary as inertia of one or more driven components increases or decreases, and/or may vary in any manner known in the art. As such, energy may be output, i.e., transferred, from system 10 and machine 11 to an environment to propel machine 11 relative to a surface.

Non-traction loads 18 may include one or more non-propulsion components of machine 11 such as, for example, hydraulic systems configured to affect movement of one or more hydraulic actuators to manipulate an implement 13. For example, non-traction loads 18 may include one or more pumps, e.g., fixed or variable displacement pumps, and/or any other source of hydraulic energy. Non-traction loads 18 may be variable loads, may be periodically operated, may have variable operating durations and/or schedules, may repeat a given cycle, and/or may be essential or non-essential to achieve a desirable and/or required operation of system 10 or machine 11. For example, a variable displacement pump may selectively request energy from hub 20 to deliver pressurized fluid toward one or more hydraulic actuators in response to a command signal, e.g., an operator command input. The pressurized fluid may be controlled and directed via a plurality of valves to affect extension and retraction of one or more hydraulic actuators to affect manipulation of a linkage and/or implement 13. As such, energy may be output, i.e., transferred, from system 10 and machine 11 to an environment to affect manipulation thereof, e.g., lift and move material via a bucket, break-up surface material via a ripper, load material into another machine, and/or any other task conventionally associated with an industry such as, for example, mining, construction, farming.

Hub 20 may be configured to selectively receive energy from engine 12, storage device 14, traction load 16, and/or non-traction loads 18, convert mechanical into electrical energy, and/or deliver electrical energy to engine 12, storage device 14, traction load 16, and/or non-traction loads 18. Hub 20 may include one or more conventional motor-generators configured to receive mechanical energy, rotate a rotor thereof, and generate an electrical current within a stator thereof. Hub 20 may also include one or more conventional inverters. The operation of a motor-generator and an inverter is well known in the art and is not further described. Hub 20 may also include one or more conventional switches configured to selectively direct and effect the direction and destination of the electrical energy. The one or more switches may include mechanical or virtual, e.g., software, switches, and are well known in the art and are not further described. It is contemplated that hub 20 may additionally include an electrical circuit interconnecting the various components thereof.

It is also contemplated that hub 20 may include hydraulic circuit with one or more pumps and/or accumulators configured to receive and/or distribute hydraulic energy and/or may include a mechanical transmission configured to receive and/or distribute mechanical energy.

Controller 22 may include one or more microprocessors, a memory, a data storage device, a communications network, and/or other components known in the art. Controller 22 may monitor one or more parameters of system 10 and may affect the operation of engine 12, storage device 14, and/or hub 20. Specifically, controller 22 may be configured to perform one or more steps of method 100 (as described below with reference to FIG. 2). Controller 22 may be integrated within a general machine control system capable of controlling additional various functions of machine 11. Controller 22 may be configured to receive input signals from one or more sensors 24, 26, 28, 30, 32, 34 perform one or more algorithms to determine appropriate output signals, and may deliver the output signals to affect control of engine 12, storage device 14, and/or hub 20. For example, controller 22 may control the amount of fuel delivered to engine 12, the timing of intake and exhaust valves associated with engine 12, the directional flow of energy associated with storage device 14, the inverter, motor-generator, and/or switches of hub 20, additional functions and/or parameters associated with engine 12, storage device 14 and/or hub 20 as known in the art, and/or one or more combinations thereof. It is contemplated that controller 22 may also receive and deliver signals via one or more communication lines (not referenced) as is known in the art. It is also contemplated that controller 22 may be configured to monitor the energy stored within storage device 14, i.e., the state of charge of storage device 14, via any suitable method, e.g., via one or more sensors (not shown) configured to produce a signal indicative of a voltage and/or current. It is further contemplated that controller 22 may be further configured to monitor any parameter of system 10 via any suitable sensor and configured affect the operation of one more components associated with traction load 16 and/or non-traction loads 18, e.g., traction motors and/or hydraulic pumps.

Sensors 24, 26, 28, 30, 32, 34 may each include one or more conventional sensors configured to establish a signal as a function of a sensed operating parameter. Sensors 24 may sense one or more operator inputs indicative of requested traction energy output configured to affect control of engine 12 and/or storage device 14 as well as the energy output directed toward traction load 16 to, e.g., propel machine 11 relative to a surface. For example, sensors 24 may be configured to sense an amount of displacement of one or more operator interface devices, e.g., pedals 17, and/or any other operator interface devices known in the art, and generate a signal indicative thereof. Sensors 26 may sense one or more operator inputs indicative of a requested non-traction energy output configured to affect control of engine 12 and/or storage device 14 as well as adjust the energy output directed to non-traction loads 18 to, e.g., manipulate implement 13 to perform a task. For example, similar to sensors 24, sensors 26 may be configured to sense an amount of displacement of one or more operator interface devices, e.g., joysticks 19, and generate a signal indicative thereof. Sensors 28 may sense one or more operating parameters of traction load 16 indicative of the amount of energy output from traction load 16, e.g., output to an environment. For example, sensors 28 may be configured to sense an amount of torque and/or speed of an output shaft of a transmission, and generate a signal indicative thereof. Sensors 30 may sense one or more operating parameters indicative of the amount of energy output from non-traction loads 18, e.g., output to an environment. For example, sensors 30 may be configured to sense fluid flow rate and/or pressure output from a source of pressurized fluid configured to affect movement of an implement to perform a task, e.g., via a hydraulic system. Sensors 32 and 34 may sense one or more operating parameters indicative of the amount of energy input to traction load 16 and non-traction loads 18, respectively. For example, sensors 32, 34 may be configured to sense the amount of energy directed, via hub 20, from engine 12 and/or storage device 14 toward traction load 16 and non-traction loads 18, respectively.

Sensors 24, 26, 28, 30, 32, 34 may include a plurality of sensors establishing a plurality of signals with respect to a common operating parameter and that the plurality of signals may be combinable into a common signal by, for example, averaging or summing. Sensors 24, 26, 28, 30, 32, 34 may embody any type of sensor known in the art, such as, for example, infrared or radar sensors, flow meters, transducers, hall sensors, and/or any other sensor known in the art and may be disposed at any location relative to engine 12, storage device 14, traction load 16, and non-traction loads 18, respectively.

Figure 2:
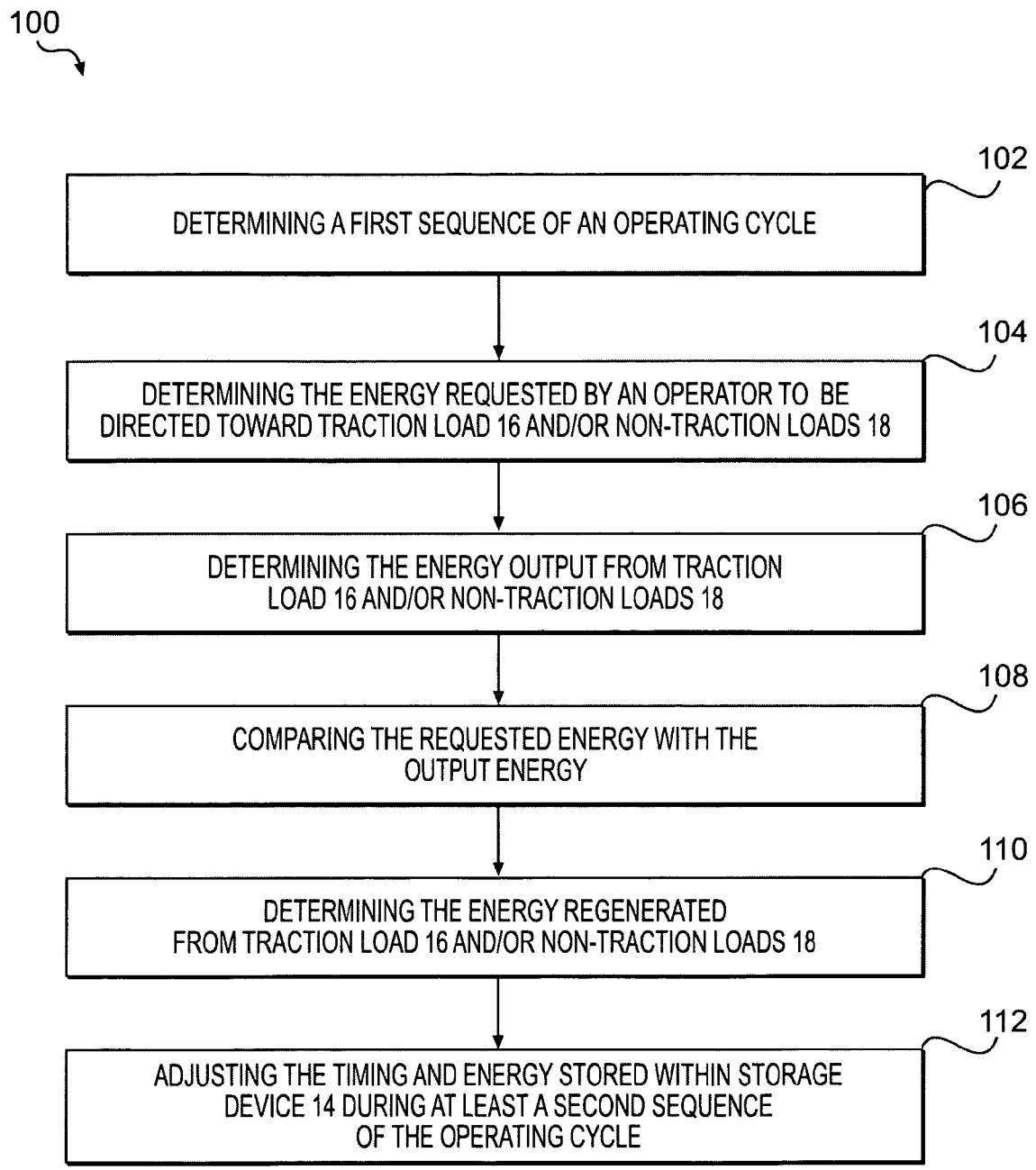
FIG. 2 is a schematic block diagram of an exemplary method configured to be performed by the controller of FIG. 1.

FIG. 2 illustrates an exemplary control method 100. Method 100 may be performed by controller 22 to control hybrid energy system 10. Specifically, method 100 may include determining a first sequence of an operating cycle, step 102. Method 100 may also include determining the energy requested by an operator to be directed toward traction load 16 and/or non-traction loads 18, step 104, and may include determining the energy output from traction load 16 and/or non-traction loads 18, step 106. Method 100 may also include comparing the requested energy with the output energy to determine any energy deficiencies during the first sequence, step 108. Method 100 may also include determining the energy regenerated from traction load 16 and/or non-traction loads 18, step 110. Method 100 may also include adjusting the energy stored within storage device 14 during a second sequence of the operating cycle, step 112. Method 100 may selectively repeat steps 102 to 112. It is contemplated that one or more of the steps of method 100 may be performed in any order and/or substantially simultaneously with one or more other steps of method 100 and are explained herein in a particular order for clarification purposes only.

Step 102 may include determining a first sequence of an operating cycle. The operating cycle may be a substantially repeated operation of one or more components of machine 11, which may correspond to a substantially repeated operation of system 10. Specifically, an operator may repeat a given cycle of operations, e.g., movement of machine 11 and/or manipulation of implement 13, through a plurality of sequences. Step 102 may include determining the first sequence as a function of an operator manually indicating the start and end of a given cycle via an operator interface device, e.g., a push button (not shown), and controller 22 receiving a signal indicative of the manually operated interface device. For example, an operator may control machine 11 to substantially traverse the same route to repetitively perform a particular task, e.g., transporting material from one site to another. As such, operator requested energy directed toward traction load 16 and the environmental loadings acting on traction load 16 with respect to a timing during a first sequence may be substantially similar with respect to a corresponding timing during a second sequence. Also, an operator may control machine 11 to substantially repeat the same manipulations of implement 13 to repetitively perform a particular task, e.g., transferring material from one pile to another pile. As such, operator requested energy directed toward non-traction loads 18 and the environmental loadings acting on non-traction loads 18 with respect to a timing during a first sequence may be substantially similar with respect to a corresponding timing during a second sequence. That is, a time incremented pattern of operator requested energy and environmental loadings on traction load 16 and non-traction loads 18 may be substantially repeated during respective sequences of a given cycle.

Step 104 may include determining an operator requested energy output for traction load 16 and/or non-traction loads 18. Specifically, step 104 may include sensing one or more parameters associated with system 10 and determining the requested energy as a function of the sensed parameters. For example, step 104 may include sensing, via sensors 24 and 26, respectively, a displacement of one or more operator interface devices, e.g., pedals or joysticks, configured to affect control of traction load 16 and/or non-traction loads 18. It is contemplated that the amount of displacement of an operator interface device may correspond to the desired amount of control, e.g., a larger displacement may correspond to a larger requested amount of energy.

Step 106 may include determining the amount of energy output from traction load 16 and/or non-traction loads 18. Specifically, step 106 may include sensing one or more parameters associated with system 10 and determining the actual amount of output energy as a function of the sensed parameters. For example, step 106 may include sensing, via sensor 28, torque and/or speed of a transmission output shaft and may include sensing, via sensor 30, the pressure and/or flow rate of pressurized fluid directed toward one or more actuators. Step 106 may also include sensing the actual energy input to traction load 16 and/or non-traction loads 18 and determining the actual energy output therefrom as a function of the energy input and the efficiency of one or more energy converting components thereof. For example, step 106 may, for traction load 16, include sensing, via sensor 32, the energy, e.g., current or torque, input to a transmission operatively connected and configured to one or more traction devices and functionally relating the sensed energy with an empirically determined transmission efficiency. Step 106, may, for non-traction loads 18, include sensing, via sensor 34, the energy, e.g., current or torque, input to one or more hydraulic pumps of a hydraulic system configured to supply a flow of pressurized fluid toward one or more actuators to affect manipulation of implement 13 and functionally relating the sensed energy with an empirically determined efficiency of the hydraulic system.

Step 108 may include comparing the requested energy with the output energy. Specifically, step 108 may include comparing the requested rate of output energy, e.g., torque or fluid flow, and the rate of actual output energy at a plurality of time increments during the first sequence to determine if the requested energy is less than the output energy at any one of the time increments. If so, step 108 may include determining an energy deficiency associated with system 10. An energy deficiency may be indicative of an operator requesting more energy from traction load 16 and/or non-traction loads 18 than system 10 can provide. It is contemplated that step 108 may include comparing the requested and output energy at each time increment of the first sequence and may include determining a plurality of energy deficiencies. It is also contemplated that step 108 may include comparing the requested and output energy via any method known in the art, such as, for example, by mapping the requested and output energies versus time as the first sequence is performed or by electronically comparing the requested and output energies at one or more discrete time increments during the first sequence. It is understood that system 10 may include various sources of potential energy such as chemical, e.g., fuel associated with engine 12, and/or electrical, e.g., voltage associated with storage device 14, and an energy deficiency may be indicative of system 10 being incapable of converting energy from one form to another to meet operator requests. For example, due to structural limitations, engine 12 may be incapable of converting energy from fuel into mechanical and/or electrical energy at a rate sufficient to enable system 10 to output energy toward traction load 16 and/or non-traction loads 18 to meet operator requests.

For example, an operator may displace an operator interface device, e.g., pedals 17, and request energy to be directed toward traction load 16 to affect a given ground speed of machine 11. In response, system 10 may initially output sufficient energy from engine 12 and/or storage device 14 toward traction load 16. If, however, traction load 16 substantially increases, e.g., machine 11 travels up a hill, system 10 may no longer be capable of outputting the requested energy and the ground speed of machine 11 may slow. As another example, an operator may displace an operator interface device, e.g., joysticks 19, and request energy to be directed toward one or more non-traction loads 18 to affect a manipulation of implement 13. In response, system 10 may initially output sufficient energy from engine 12 and/or storage device 14 toward non-traction loads 18. If, however, non-traction loads 18 substantially increase, e.g., implement 13 transition from soft material to hard material, system 10 may no longer be capable of outputting the requested energy and the movement of implement 13 may slow or stall. Additionally, system 10 may initially deliver sufficient energy to traction load 16 and/or non-traction loads 18 to achieve the requested output and may subsequently cease to provide sufficient energy due to prolonged operation of a high load operation. For example, as machine 11 progresses up a hill at high speed, controller 22 may control engine 12 and/or storage device 14 to maximum energy output to satisfy the high energy demand. When the energy stored within storage device 14 is depleted, machine 11 may slow because engine 12 may not be capable of satisfying the high energy demand without additional energy output from storage device 14.

Step 110 may include monitoring the energy regenerated by system 10. Specifically, step 110 may include determining the amount of energy regenerated from traction load 16 and non-traction loads 18 at the plurality of time increments during the first sequence to determine if regenerated energy is dissipated to an environment. If so, step 110 may include determining an energy surplus associated with system 10. An energy surplus may be indicative of system 10 being capable of regenerating energy from traction load 16 and/or non-traction loads 18 yet not being capable of storing the regenerated energy within storage device 14. For example, step 110 may include sensing one or more parameters of system 10 and/or machine 11 indicative of dissipated regenerated energy such as, for example, sensing displacement, e.g., via sensors 24, 26 or additional sensors, of an operator interface device configured to retard movement of machine 10, e.g., pedals 17, and/or configured to retard movement of implement 13, e.g., joysticks 19. It is contemplated that step 110 may include sensing any parameter of system 10 and/or machine 11 indicative of mechanical and/or hydraulic retarding of traction load 16 and/or non-traction loads 18. It is also contemplated that regenerated energy may be directed toward storage device 14 during a dynamic braking operation associated with traction load 16 or an over-running operation associated with non-traction loads 18. Regenerated energy and the systems associated with such energy are well known in the art and are not further explained.

Step 112 may include adjusting the amount of energy stored within storage device 14 as well as adjusting the timing of charging and discharging storage device 14 during a second sequence of the operating cycle. Specifically, step 112 may include adjusting the operation of storage device 14 as a function of the determined energy deficiencies and energy surpluses. If an energy deficiency was determined at a given time increment during the first sequence, step 112 may include increasing the amount of energy stored within storage device 14 before the corresponding time increment during the second sequence to reduce and/or eliminate the energy deficiency by allowing storage device 14 to output additional energy than it would otherwise. If an energy surplus was determined at a given time increment during the first sequence, step 112 may include decreasing the amount of energy stored within storage device 14 before the corresponding time increment during the second sequence to reduce and/or eliminate the energy surplus by allowing storage device 14 to accept additional energy than it would otherwise. It is contemplated that storage device 14 may be controlled to be at any state of charge and may be charged and discharged according to any timing during the second sequence. It is also contemplated that step 112 may include controller 22 automatically controlling the timing and amount of energy associated with storage device 14 during the second sequence. It is further contemplated that step 112 may further reduce and/or eliminate energy deficiencies and/or surpluses in third and subsequent sequences of the cycle.

INDUSTRIAL APPLICABILITY

The disclosed method and apparatus may be applicable to control any hybrid energy system. The disclosed method and apparatus may advantageously store and direct energy. The operation of method 10 is explained below with reference to a particular example of a repetitive manipulation of non-traction loads 18, e.g., implement 13, for exemplary purposes only. It is understood that the operation of method 10 is equally applicable to repetitive manipulation of traction load 16, e.g., traction device 15, and/or a combination of repetitive manipulation of non-traction loads 18 and traction load 16, and that the operation of method 10 is not limited to the particular example explained below but is applicable to any type of manipulation of non-traction loads 18, traction load 16, and/or any combination thereof.

System 10 may be operatively associated with machine 11 and traction load 16 may be operatively configured to propel the vehicle relative to a work-site surface. Traction load 16 may include one or more traction motors configured to receive electrical energy from hub 20 and direct mechanical energy, e.g., torque and speed, toward traction devices 15. Non-traction loads 18 may include one or more hydraulic pumps configured to receive energy from hub 20 and supply pressurized fluid to one or more hydraulic actuators via a hydraulic system to affect manipulation of implement 13. Hub 20 may selectively receive electrical energy from engine 12 and/or storage device 14. For example, traction load 16 may selectively produce electrical energy during a dynamic braking mode or an over-running operation, e.g., downhill movement or deceleration, and may regenerate electrical energy to hub 20. For example, non-traction loads 18 may selectively produce electrical energy during an over-running operation, e.g., an external load assists in moving implement 13, and may regenerate electrical energy to hub 20. For example, electrical energy directed to hub 20 from traction load 16 and/or non-traction loads 18 may be further directed from hub 20 to storage device 14, stored therein, and subsequently directed toward traction load 16 and/or non-traction loads 18 to reduce the amount of energy required from engine 12.

For example, an operator may affect manipulation of implement 13 through one or more sequences of a repetitive cycle including, movement of an arm and bucket to load the bucket with material from a first pile, movement of the arm to position loaded bucket adjacent a second pile, movement of the bucket to empty the material to the second pile, and movement of the arm and empty bucket to position the bucket adjacent the first pile. An operator may, for example, indicate the beginning of a first sequence of the cycle just before loading the bucket and may indicate the end of the first sequence just after positioning the empty bucket adjacent the first pile, step 102. The operator may perform the cycle and controller 22 may determine the energy requested by the operator to affect each of the manipulations, step 104, and may determine the energy output from implement 13, step 106. Controller may compare the requested energy and the output energy to determine if an energy deficiency occurred during the first sequence, step 108. For example, controller 22 may determine that an energy deficiency occurred when loading the bucket with material from the first pile. Controller 22 may also include determining the amount of energy regenerated from the implement to determine if an energy surplus occurred during the first sequence, step 110. For example, controller 22 may determine that an energy surplus occurred when moving the empty bucket adjacent the first pile.

The operator may perform a second sequence of the cycle substantially similar to the first sequence. Alternatively, the operator may program controller 22 to automatically affect the desired manipulations of implement 13 during the second and subsequent sequences of the cycle. During the second sequence, controller 22 may adjust the timing and energy stored within storage device 14, step 112. During the second sequence, controller 22 may discharge storage device 14 sometime before moving the bucket adjacent the first pile and may charge storage device 14 sometime before loading the bucket. For example, controller 22 may increase the energy within storage device 14 before loading the bucket and subsequently direct that energy toward implement 13 while loading the bucket to reduce and/or eliminate the energy deficiency associated with that manipulation. Additionally, controller 22 may deplete the energy stored within storage device 14 before moving the bucket adjacent the first pile and subsequently directing regenerated energy thereto while moving the bucket adjacent the first pile to reduce and/or eliminate the energy surplus associated with that manipulation. It is contemplated that controller 22 may affect a discharge of storage device 14 by controlling system 10 to direct energy from storage device 14 toward non-traction load 18 and correspondingly reducing the output of engine 12 and/or controlling storage device 14 to remain at a low energy storage level from, e.g., a maximum energy output operation. It is also contemplated that controller 22 may affect a charge of storage device 14 by controlling system 10 to direct energy from engine 12 toward storage device 14 and/or controlling storage device 14 to remain at a high energy storage level from, e.g., a regeneration operation.

A conventional control methodology for a hybrid energy system may attempt to maintain the energy within a storage device to be approximately 50% so that the storage device is capable of both an energy assist operation and an energy regeneration operation. However, a 50% state of charge may be not be sufficient to meet a requested energy output and a 50% storage capacity may not be sufficient to fully accept regenerated energy input given upcoming variations in traction load 16 and/or non-traction loads 18. Although a 50% state of charge may allow for some energy output and some energy input, it may not be sufficient for both operations. By increasing the energy within storage device 14, system 10 may be more capable of outputting additional energy during subsequent manipulations. By decreasing the energy within storage device 14, system 10 may be more capable of regenerating additional energy during subsequent manipulations. By adjusting the timing and energy stored within storage device 14 as a function of determined energy deficiencies and energy surpluses, system 10 may be configured to more sufficiently meet requested energy and accept regenerated energy.

It will be apparent to those skilled in the art that various modifications and variations can be made to the disclosed system for controlling a hybrid energy system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method of controlling a hybrid energy system including an energy source and a storage device operatively connected to a machine including at least one non-traction load, comprising:
   identifying, by a processor associated with a controller, a first operating sequence indicative of a repeated operation of the at least one non-traction load, the first operating sequence including a plurality of time increments;
   determining, by the processor, first and second parameters of the hybrid energy system respectively indicative of a requested energy of the at least one non-traction load and an output energy of the at least one non-traction load;
   comparing, by the processor, the determined first and second parameters at the plurality of time increments of the first operating sequence;
   determining, by the processor, a third parameter of the hybrid energy system indicative of energy regenerated from the at least one non-traction load;
   monitoring, by the processor, the third parameter at the plurality of time increments of the first operating sequence;
   determining, by the processor, at least one of an energy deficiency or an energy surplus associated with the non-traction load of the hybrid energy system, the energy deficiency being a function of the first and second determined parameters and the energy surplus being a function of the third determined parameter; and
   selectively adjusting, by the processor, energy stored within the storage device during at least a portion of a second operating sequence as a function of the determined energy deficiency or the determined energy surplus, the second operating sequence including a plurality of time increments.

2. The method of claim 1, further including:
   determining an energy deficiency at a first time increment during the first operating sequence if the first determined parameter is greater than the second determined parameter, the first time increment being one of the plurality of time increments of the first operating sequence; and
   selectively increasing the amount of energy stored within the storage device at a second time increment during the second operating sequence, the second time increment being one of the plurality of time increments of the second operating sequence and before a time increment during the second operating sequence corresponding to the first time increment of the first operating sequence.

3. The method of claim 1, further including:
   determining an energy surplus at a first time increment during the first operating sequence if the monitored third parameter is indicative of regenerated energy being dissipated toward the environment, the first time increment being one of the plurality of time increments of the first operating sequence; and
   selectively decreasing the amount of energy stored within the storage device at a second time increment during the second operating sequence, the second time increment being one of the plurality of time increments of the second operating sequence and before a time increment during the second operating sequence corresponding to the first time increment of the first operating sequence.

4. The method of claim 1, further including:
   determining a plurality of energy variations during the first operating sequence, each energy variation being one of an energy deficiency or an energy surplus; and
   selectively adjusting the amount of energy stored within the storage device as a function of each of the determined plurality of energy variations.

5. The method of claim 1, wherein the at least one non-traction load includes an implement, the method further including:
   substantially repeating a manipulation cycle of the implement; and
   identifying the first and second operating sequences as two sequences of the cycle.

6. The method of claim 1, wherein identifying the first sequence includes receiving an operator input indicative of the start of the first sequence and receiving an operator input indicative of the end of the first sequence.

7. The method of claim 1, wherein the system further includes at least one traction load, the method further comprising:
   determining fourth and fifth parameters of the hybrid energy system respectively indicative of a requested traction energy of the at least one traction device and an output from the at least one traction load;
   comparing the determined fourth and fifth parameters at the plurality of time increments of the first operating sequence;
   determining a sixth parameter of the hybrid energy system indicative of energy regenerated from the at least one traction load;
   monitoring the sixth parameter at the plurality of time increments of the first operating sequence;
   determining at least one of an energy deficiency or an energy surplus associated with the non-traction load of the hybrid energy system, the energy deficiency being a function of the fourth and fifth determined parameters and the energy surplus being a function of the sixth determined parameter; and
   selectively adjusting the amount of energy stored within the storage device during at least a portion of a second operating sequence as a function of a determined energy deficiency or a determined energy surplus associated with the traction load of the hybrid energy system.

8. The method of claim 7, wherein determining the sixth parameter includes sensing displacement of an operator interface device configured to retard operation of the at least one traction device.

9. The method of claim 1, wherein determining the third parameter includes sensing displacement of an operator interface device configured to retard operation of the at least one non-traction device.

10. The method of claim 1, wherein determining the second parameter includes:
   determining energy input to the at least one non-traction load; and
   determining energy output from the at least one non-traction load as a function of the determined energy input and energy efficiency associated the at least one non-traction load.

11. A machine comprising:
   a hybrid energy system including an energy source, an energy storage device, at least one non-traction load and a controller configured to:
   monitor one or more parameters of the machine during a first manipulation sequence of the non-traction load;
   determine a first energy indicative of an amount of energy requested by an operator to be directed toward the at least one non-traction load during the first manipulation sequence;
   determine a second energy indicative of an amount of energy output from the at least one non-traction load during the first manipulation sequence;
   determine a third energy indicative of an amount of energy regenerated from the at least one non-traction load during the first manipulation sequence;
   automatically control the energy stored within the storage device during a second manipulation sequence as a function of the determined first, second, and third energies, the second manipulation sequence being substantially similar to the first manipulation sequence;
   determine an energy deficiency during the first manipulation sequence as a function of the determined first and second energies; and
   selectively decrease the energy stored within the storage device during the second manipulation sequence as a function of the determined energy deficiency.

12. The system of claim 11, further including:
   an operator interface device configured to direct energy toward the at least one non-traction load; and
   a sensor configured to produce a first signal indicative of an amount of displacement of the at least one operator interface device;
   wherein the controller is configured to determine the first energy as a function of the first signal.

13. The system of claim 11, further including a sensor configured to produce a first signal indicative of an amount of energy output from the at least one non-traction load, wherein the controller is configured to determine the second energy as a function of the first signal.

14. The system of claim 11, wherein the controller is further configured to:
   determine an energy surplus during the first manipulation as a function of the determined third energy; and
   selectively increase the energy stored within the storage device during the second manipulation sequence as a function of the determined energy surplus.

15. The system of claim 11, wherein the non-traction load is an implement operatively connected to the machine.

16. A method of controlling a hybrid energy system configured to affect manipulation of at least one implement of a machine, comprising:
   establishing, by a processor associated with a controller, a start of a first sequence of a substantially repeated manipulation of the implement;
   performing, by the processor, the first sequence;
   sensing, by the processor, a first parameter indicative of a displacement of an operator interface device configured to affect energy output from the implement during at least a portion of the first sequence;
   sensing, by the processor, a second parameter indicative of energy output from the implement during the at least a portion of the first sequence;
   comparing, by the processor, the first sensed parameter with the second sensed parameter for the at least a portion of the first sequence;
   determining, by the processor, an energy deficiency associated with the hybrid energy system if the first sensed parameter is greater than the second sensed parameter;
   establishing, by the processor, an end of the first sequence;
   performing, by the processor, a second sequence of the substantially repeated manipulation of the implement; and
   automatically controlling, by the processor, the amount of energy stored within the storage device during the second sequence as a function of a determined energy deficiency.

17. The method of claim 16, further including:
   determining when an energy deficiency starts as a function of a first time increment wherein the sensed first parameter is less than the sensed second parameter;
   determining when an energy deficiency ends as a function of a second time increment wherein the sensed first parameter is no longer less than the sensed second parameter; and
   determining an amount of energy as a function of the energy difference between the sensed first and second parameters and the time lapse between the first and second time increments.

18. The method of claim 17, wherein the second sequence includes third and fourth time increments respectively corresponding to the first and second time increments of the first sequence, the method further including:
   storing an amount of energy within the storage device during the second sequence before the third time increment; and
   directing the stored amount of energy from the storage device toward the at least one implement during the second sequence between the third and fourth time increments.

19. The method of claim 16, further including:
   sensing a third parameter indicative of a mechanical or hydraulic retarding of the implement;
   determining an energy surplus when the implement is mechanically or hydraulically retarded; and
   automatically controlling the amount of energy stored within the storage device during the second sequence as a function of a determined energy surplus.

20. A machine comprising:
   a hybrid energy system including an energy source, an energy storage device, at least one non-traction load and a controller configured to:
   monitor one or more parameters of the machine during a first manipulation sequence of the non-traction load;
   determine a first energy indicative of an amount of energy requested by an operator to be directed toward the at least one non-traction load during the first manipulation sequence;
   determine a second energy indicative of an amount of energy output from the at least one non-traction load during the first manipulation sequence;

determine a third energy indicative of an amount of energy regenerated from the at least one non-traction load during the first manipulation sequence;

automatically control the energy stored within the storage device during a second manipulation sequence as a function of the determined first, second, and third energies, the second manipulation sequence being substantially similar to the first manipulation sequence;

determine an energy surplus during the first manipulation as a function of the determined third energy; and selectively increase the energy stored within the storage device during the second manipulation sequence as a function of the determined energy surplus.

21. The system of claim 20, further including:
an operator interface device configured to direct energy toward the at least one non-traction load; and
a sensor configured to produce a first signal indicative of an amount of displacement of the at least one operator interface device;
wherein the controller is configured to determine the first energy as a function of the first signal.

22. The system of claim 20, further including a sensor configured to produce a first signal indicative of an amount of energy output from the at least one non-traction load, wherein the controller is configured to determine the second energy as a function of the first signal.

23. The system of claim 20, wherein the non-traction load is an implement operatively connected to the machine.

* * * * *